Oct. 26, 1926.
A. ROSEWOOD
1,604,423
TRANSMISSION DRIVE COUPLING
Filed May 31, 1923
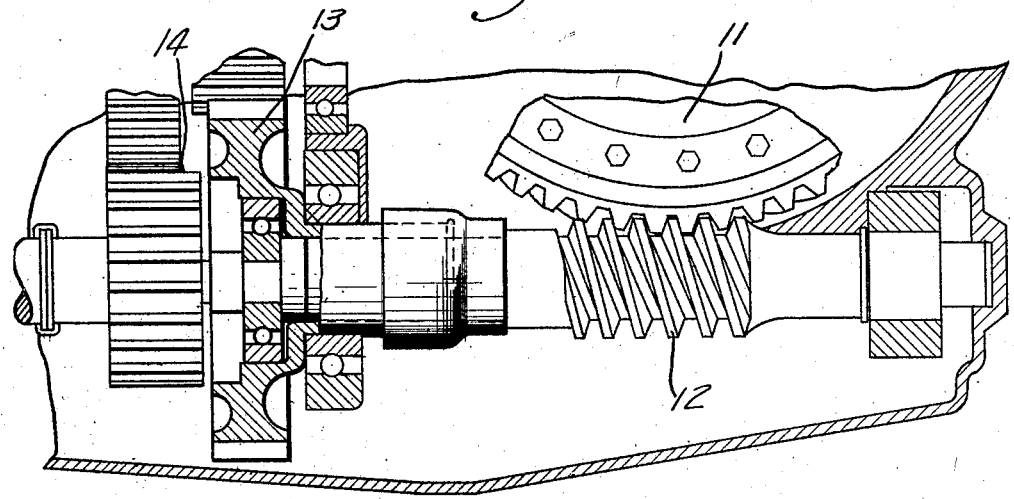
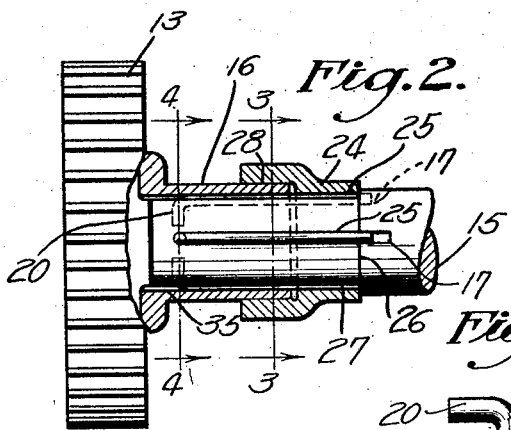
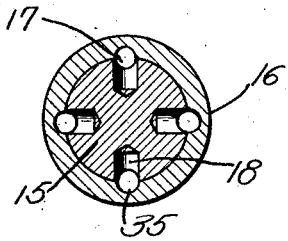
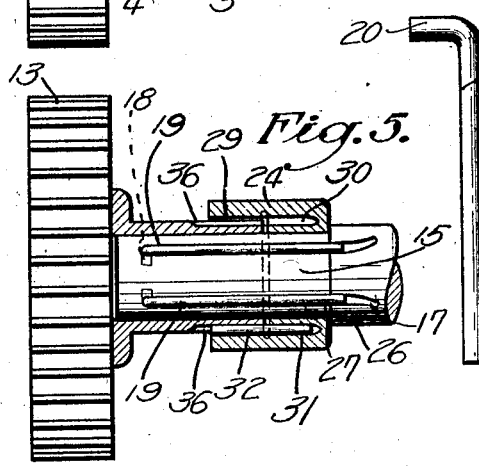
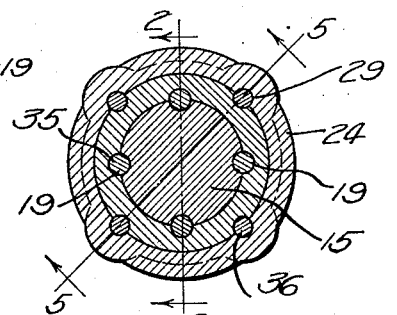
INVENTOR
ALFRED ROSEWOOD,
BY
Graham + Rerser
ATTORNEYS.

Patented Oct. 26, 1926.

1,604,423

UNITED STATES PATENT OFFICE.

ALFRED ROSEWOOD, OF WEST RIVERSIDE, CALIFORNIA.

TRANSMISSION-DRIVE COUPLING.

Application filed May 31, 1923. Serial No. 642,475.

This invention relates to means for coupling together rotating members employed in automobile and tractor power transmissions.

In certain tractors and automobiles, the wheels are driven through a worm gear and worm wheel speed reduction. The strains placed on the transmission members of such equipment is very severe and frequent replacement of parts is necessary. In the Fordson tractor, to which my invention is particularly applicable, the rear axle shaft has a worm wheel mounted thereupon which is driven by a worm rotated by the transmission gears. The engagement of the worm with the transmission is provided by cutting longitudinal channels in one end of the worm shaft, which are engaged by projections formed upon the inner face of a tubular extension formed upon one of the transmission gears. The extensive strains placed upon this coupling, and the effect of vibration, cause the rapid crystallization and disintegration of the ridge and channel inter-engaging formation of the shaft and the sleeve which fits thereover. In order to re-establish a working condition, after the stripping of these engagement members, it is necessary to replace both the worm and also the gear having the tubular extension for driving the worm.

It is an object of my invention to provide an improved form of transmission drive coupling which is so formed that it has great inherent strength and resists the action of vibration, and which may be quickly renewed by replacement of a number of keys which may be obtained at an extremely low cost as compared to the now customary replacement of the worm and the cooperating transmission gear.

It is a further object of the invention to provide a coupling of this character in which an annular recess is provided, into which recess a sleeve formed upon the cooperating transmission member extends, and inner and outer key arrangements which engage the inner and outer surfaces of the sleeve wall, thus contributing greatly to the life of the coupling.

It is a further object of the invention to provide a coupling of this character, employing keys of round cross section, so that the torsion between the transmission members causes the binding of the keys in the key ways in a manner to overcome vibration therein.

The especial advantages of my invention and further objects thereof will be made evident hereinafter.

Referring to the drawing which is for illustrative purposes only:

Fig. 1 is a fragmentary section illustrating an important use of the invention.

Fig. 2 is a partially sectioned fragmentary view showing the end of the worm shaft and the co-operating gear of the transmission which is coupled in driving arrangement to the shaft, this section being taken substantially on a plane indicated by the line 2—2 of Fig. 3.

Fig. 3 is a section taken upon a plane represented by the line 3—3 of Fig. 2.

Fig. 4 is a section taken on a plane represented by the line 4—4 of Fig. 2.

Fig. 5 is a fragmentary sectional view similar to Fig. 2, but derived on a plane represented by the line 5—5 of Fig. 3.

Fig. 6 is an enlarged view of an inner key.

In Fig. 1, 11 indicates a worm wheel of a tractor drive which is driven by a worm gear 12 rotated by a gear 13 of the speed change transmission gearing 14. As shown in Figs. 2 and 5 of the drawing, the forward shaft extension 15 of the worm 12 extends within a tubular extension or sleeve 16 which projects concentrically rearwardly from the gear 13. In the face of the shaft extension 15, semi-circular key ways 17 are cut, these key ways extending longitudinally. At the forward ends of the key way 17, radial holes 18 are drilled as shown in Fig. 4. Keys 19, such as indicated in Fig. 6 are made from round stock and have the forward ends 20 thereof bent perpendicularly with respect to the key proper. These keys are placed in the key way 17, as shown in Figs. 2 and 5 with the ends 20 thereof extending into the openings 18. Over the shaft 15 and over the keys 19, a collar 24 is forced, this collar having semi-circular key ways 25·formed therein for receiving the outer semi-cylindrical portions of the key 19. The collar 24 is forced back into a position against a shoulder 26 on the shaft and encloses the rearward ends 27 of the keys 19.

It will be seen that the keys are thereby held securely in place in the key ways and are prevented from longitudinal movement by engagement of the ends thereof in the holes 18.

The forward portion of the collar 24 is enlarged and counter bored, as indicated at 28, this counter bore providing a recess between the forward end of the collar and the shaft 15. Semi-circular key ways 29 are formed in the counter bored portion of the collar as indicated in Fig. 5. As shown at 31, in Fig. 5, keys 32 are placed in the key ways 29, these keys 32 extending rearwardly into the holes 30 and being held in position thereby. The sleeve 16 of the gear 13 is provided with internal semi-circular key ways 35 for fitting over the keys 19, and is also provided with outer relatively short semi-circular key ways 36 which cooperate with the keys 32, thereby forming an inner and outer engagement between the sleeve 16 and the shaft 15 having the counter bored collar 24 situated thereupon.

It will be recognized that in this manner, the cross section of key metal which must be sheared, is very materially increased, and that the use of round keys is particularly valuable owing to the fact that when in driving operation, the keys are bound tightly in the key ways and prevent intervening vibration which causes rapid crystallization of engaging parts. In this transmission arrangement, any failure is limited to the shearing of the keys which may be readily replaced at a very low cost. I have found, however, that the life of the keys of the type and employed as shown, is several times that of the standard locking ridge and channel arrangement now employed.

Although I have shown my invention herein as applying to tractor drives, it will be readily recognized that the invention may be employed in various other uses and shall, therefore, be defined and limited by the following claims only.

I claim as my invention:

1. In a drive coupling, the combination of: a shaft having longitudinal key ways cut therein; keys set in said key ways; a collar member resting over the inner ends of said keys, holding them in said key ways and keying said collar upon said shaft, said collar having a counter bore at the forward end thereof, forming a recess between said shaft and the counter bored portion of said collar, there being key ways formed in said counterbored portion of said collar; outer keys adapted to rest in said key ways in said counterbore; and a sleeve fitting over the keyed end of said shaft and extending into said recess, there being inner and outer key ways in said sleeve receiving said keys.

2. In a drive coupling, the combination of: a shaft having longitudinal semi-circular key ways cut therein and radial holes formed at the forward ends of said key ways; keys set in said key ways, said keys being formed of round stock and having the forward ends thereof bent at right angles and extended into said radial holes; a collar member resting over the inner ends of said keys, holding them in said key ways and keying said collar upon said shaft, said collar having a counter bore at the forward end thereof forming a recess between said shaft and the counterbored portion of said collar, there being semi-circular key ways formed in said counterbored portion of said collar and round key receiving holes extending rearwardly in alignment with said key ways of said counterbored portion; outer keys adapted to rest in said key ways in said counter bore; and a sleeve fitting over the keyed end of said shaft and extending into said recess, there being inner and outer key ways in said sleeve receiving said keys, and to extend into said key receiving holes.

In testimony whereof, I have hereunto set my hand at Los Angeles, California, this 23rd day of May, 1923.

ALFRED ROSEWOOD.